(12) United States Patent
Nagelberg et al.

(10) Patent No.: US 10,454,677 B1
(45) Date of Patent: Oct. 22, 2019

(54) CRYPTOGRAPHIC KEY GENERATION FROM BIOMETRIC DATA

(71) Applicant: UIPCO, LLC, San Antonio, TX (US)

(72) Inventors: Alexander B. Nagelberg, San Antonio, TX (US); Nathan Mahoney, Boerne, TX (US); Joseph Delong, San Antonio, TX (US)

(73) Assignee: United Services Automobile Associate (USAA), San Antonio, TX (US)

( * ) Notice: Subject to any disclaimer, the term of this patent is extended or adjusted under 35 U.S.C. 154(b) by 265 days.

(21) Appl. No.: 15/441,494

(22) Filed: Feb. 24, 2017

Related U.S. Application Data

(60) Provisional application No. 62/299,104, filed on Feb. 24, 2016.

(51) Int. Cl.
| | | |
|---|---|---|
| H04L 9/00 | (2006.01) | |
| H04L 9/08 | (2006.01) | |
| H04L 9/06 | (2006.01) | |
| G06K 9/00 | (2006.01) | |

(52) U.S. Cl.
CPC .......... H04L 9/0866 (2013.01); H04L 9/0637 (2013.01); H04L 9/0643 (2013.01); H04L 9/0869 (2013.01); G06K 9/00067 (2013.01)

(58) Field of Classification Search
CPC .................................................. H04L 9/0866
USPC ......................................................... 380/44
See application file for complete search history.

(56) References Cited

U.S. PATENT DOCUMENTS

| | | | |
|---|---|---|---|
| 7,979,716 B2* | 7/2011 | Fiske | G06F 21/32 711/164 |
| 9,569,771 B2 | 2/2017 | Lesavich et al. | |
| 9,722,790 B2 | 8/2017 | Ebrahimi | |
| 9,774,578 B1 | 9/2017 | Ateniese et al. | |
| 2009/0210328 A1 | 8/2009 | Fomenko et al. | |
| 2013/0051636 A1* | 2/2013 | Hara | G06T 5/003 382/124 |
| 2015/0086016 A1* | 3/2015 | Oshida | H04L 9/3239 380/255 |
| 2015/0278820 A1 | 10/2015 | Meadows | |
| 2015/0332395 A1 | 11/2015 | Walker et al. | |
| 2015/0356524 A1 | 12/2015 | Pennanen | |
| 2015/0356555 A1 | 12/2015 | Pennanen | |
| 2015/0371224 A1 | 12/2015 | Lingappa | |

(Continued)

FOREIGN PATENT DOCUMENTS

| | | |
|---|---|---|
| AU | 2016101183 A4 | 9/2016 |
| CN | 105681301 A | 6/2016 |

(Continued)

*Primary Examiner* — Longbit Chai
(74) *Attorney, Agent, or Firm* — Fletcher Yoder P.C.

(57) ABSTRACT

Techniques are described for cryptographic key generation based on biometric data associated with a user. Biometric data, such as fingerprint(s) and/or heartbeat data, may be collected using one or more sensors in proximity to the user. The biometric data may be analyzed to generate a cryptographic key. In some implementations, the key may be employed by the user to access data, access certain (e.g., secure) feature(s) of an application, authenticate the user, digitally sign document(s), and/or for other purpose(s). In some implementations, the key may be re-generated for each access request or authentication instance, based on the user's fingerprint or other biometric data.

20 Claims, 10 Drawing Sheets

(56) References Cited

U.S. PATENT DOCUMENTS

| | | |
|---|---|---|
| 2015/0379510 A1 | 12/2015 | Smith |
| 2016/0182503 A1* | 6/2016 | Cheng .................. H04L 63/0861 726/7 |
| 2016/0203477 A1 | 7/2016 | Yang et al. |
| 2016/0261411 A1 | 9/2016 | Yau et al. |
| 2016/0321751 A1 | 11/2016 | Creighton, IV et al. |
| 2016/0330027 A1 | 11/2016 | Ebrahimi |
| 2016/0358165 A1 | 12/2016 | Maxwell |
| 2016/0365978 A1 | 12/2016 | Ganesan et al. |
| 2017/0053249 A1 | 2/2017 | Tunnell et al. |
| 2017/0076280 A1 | 3/2017 | Castinado et al. |
| 2017/0076286 A1 | 3/2017 | Castinado et al. |
| 2017/0078299 A1 | 3/2017 | Castinado et al. |
| 2017/0091750 A1* | 3/2017 | Maim .................. H04L 9/3236 |
| 2017/0103391 A1 | 4/2017 | Wilson, Jr. et al. |
| 2017/0109748 A1 | 4/2017 | Kote |
| 2017/0140375 A1 | 5/2017 | Kunstel |
| 2017/0177898 A1 | 6/2017 | Dillenberger |
| 2017/0206382 A1 | 7/2017 | Rodriguez De Castro et al. |
| 2017/0228704 A1 | 8/2017 | Zhou et al. |
| 2017/0230375 A1 | 8/2017 | Kurian |
| 2017/0232300 A1 | 8/2017 | Tran et al. |
| 2017/0244707 A1 | 8/2017 | Johnsrud et al. |
| 2017/0250972 A1 | 8/2017 | Ronda |
| 2017/0278186 A1 | 9/2017 | Creighton, IV et al. |
| 2017/0279801 A1 | 9/2017 | Andrade |
| 2017/0287068 A1 | 10/2017 | Nugent |
| 2017/0289111 A1 | 10/2017 | Voell et al. |

FOREIGN PATENT DOCUMENTS

| | | |
|---|---|---|
| CN | 106230808 A | 12/2016 |
| CN | 106230852 A | 12/2016 |
| CN | 106408299 A | 2/2017 |
| CN | 106484836 A | 3/2017 |
| CN | 106504091 A | 3/2017 |
| KR | 101590076 B1 | 2/2016 |
| KR | 101591244 B1 | 2/2016 |
| KR | 20160150278 A | 12/2016 |
| KR | 101762245 B1 | 7/2017 |
| KR | 101773073 B1 | 8/2017 |
| KR | 101773074 B1 | 8/2017 |
| KR | 101780636 B1 | 9/2017 |
| WO | 2016036969 A1 | 3/2016 |
| WO | 2017006134 A1 | 1/2017 |
| WO | 2017006135 A1 | 1/2017 |
| WO | 2017006136 A1 | 1/2017 |
| WO | 2017021154 A1 | 2/2017 |
| WO | 2017044554 A1 | 3/2017 |
| WO | 2017066715 A1 | 4/2017 |
| WO | 2017079795 A1 | 5/2017 |
| WO | 2017091530 A1 | 6/2017 |
| WO | 2017104899 A1 | 6/2017 |
| WO | 2017119564 A1 | 7/2017 |
| WO | 2017136956 A1 | 8/2017 |
| WO | 2017139688 A1 | 8/2017 |
| WO | 2017146333 A1 | 8/2017 |

* cited by examiner

CRYPTOGRAPHIC KEY GENERATION FROM BIOMETRIC DATA

CROSS REFERENCE TO RELATED APPLICATION

The present disclosure is related to, and claims priority to, U.S. Provisional Patent Application Ser. No. 62/299,104, titled "Cryptographic Key Generation from Biometric Data," which was filed on Feb. 24, 2016, the entirety of which is hereby incorporated by reference into the present disclosure.

BACKGROUND

Organizations and individuals that operate and/or manage computing systems may implement various security measures to prevent unauthorized individuals and processes from accessing secured data stored on the systems, gaining control of processes executing on the systems, introducing new (e.g., malicious) processes to the systems, and/or gaining access for other purposes. Traditionally, cryptographic information such as cryptographic keys may be employed to authenticate an individual and/or verify that an individual or process is authorized to access a system. Cryptographic keys may also be employed to secure communications over a network. With increasing processing power, traditionally generated cryptographic keys may be more vulnerable to attackers who are able to recreate and employ the keys to gain unauthorized access to systems, communications, data, and/or processes. Such attackers may also employ spoofed keys to impersonate an authorized individual or process.

SUMMARY

Implementations of the present disclosure are generally directed to determining cryptographic keys based on biometric data. More specifically, implementations are directed to analyzing one or more portions of biometric data to determine a value corresponding to each portion, and combining the values to determine a cryptographic key.

In general, innovative aspects of the subject matter described in this specification can be embodied in methods that includes actions of: receiving biometric data collected by at least one sensor; determining a plurality of values based on the biometric data, each value in the plurality of values corresponding to a respective portion of the biometric data; and providing a cryptographic key based at least partly on a combination of the plurality of values.

Implementations can optionally include one or more of the following features: the biometric data includes at least one fingerprint; the plurality of values correspond to different portions of the fingerprint; each value indicates a density of traces in the corresponding portion of the fingerprint; each value indicates an arrangement of traces in the corresponding portion of the fingerprint; the biometric data includes at least one heartbeat waveform; the plurality of values correspond to different portions of the heartbeat waveform; generating the cryptographic key includes accessing seed data including a seed; generating the cryptographic key includes hashing the combination of the plurality of values, based on the seed, to generate the cryptographic key; determining the value corresponding to the portion of the biometric data includes determining an initial value based on an analysis of the corresponding portion; determining the value corresponding to the portion of the biometric data includes randomly varying the initial value within a tolerance range to generate the value; providing the cryptographic key for use in signing a digital document; generating a passport that includes a public key corresponding to the cryptographic key; and/or providing the passport for use in accessing data stored on at least one blockchain.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or improvements over traditional solutions. By employing user-specific biometric data to generate a cryptographic key associated with the user, implementations provide a cryptographic key that is specific to the user (e.g., unique among a group of users), less prone to unauthorized duplication, and thus more secure than a key generated using traditional methods. Because the key may be employed to access applications and/or data on secured systems, implementations provide a technical improvement over traditional systems in which access is granted through use of a key that may be less secure. Moreover, the use of a key generated from biometric data enables an individual to be identified and/or authenticated more reliably than traditional techniques for identifying and/or authenticating an individual. The more reliable authentication provided by implementations may lead to fewer failed authentication attempts. Accordingly, implementations may consume less processing power, memory, storage space, network capacity, and/or other computing system resources than traditional authentication systems that may require more attempts before successfully authenticating a user. Further, implementations may provide for faster and/or more efficient authentication than the use of biometric authentication without key generation, thus providing for an authentication system that may consume less memory, less processing power, less storage, and/or less network capacity than other techniques. In some implementations, the private key that is generated based on biometric data may not be stored, and may be re-generated for each use. Accordingly, the risk of the private key being compromised may be reduced and/or eliminated.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DETAILED DESCRIPTION

Implementations of the present disclosure are directed to systems, devices, methods, and computer-readable media for cryptographic key generation based on biometric data associated with a user. Biometric data, such as fingerprint(s) and/or heartbeat data, may be collected using one or more sensors in proximity to the user. The biometric data may be analyzed to generate a cryptographic key. In some implementations, the key may be employed by the user to access data, access certain (e.g., secure) feature(s) of an application, authenticate the user, digitally sign document(s), and/or for other purpose(s). In some implementations, the key may be re-generated for each access request or authentication instance, based on the user's fingerprint or other biometric data. Generation of a cryptographic key based on biometric data may ensure that the generated key is unique to the particular user. The use of biometric data that is substantially the same over time for a particular user may ensure that the same cryptographic key is re-generated in each instance based on the same biometric data. Implementations may also ensure that unauthorized entities are prevented from spoofing the key associated with a particular user, given that other entities may not have access to the user's biometric data. Given the natural variation in biometric data, implementations may ensure the generation of different keys for different users, such that a generated key is unique for a particular user among a population of users.

Figure 1:
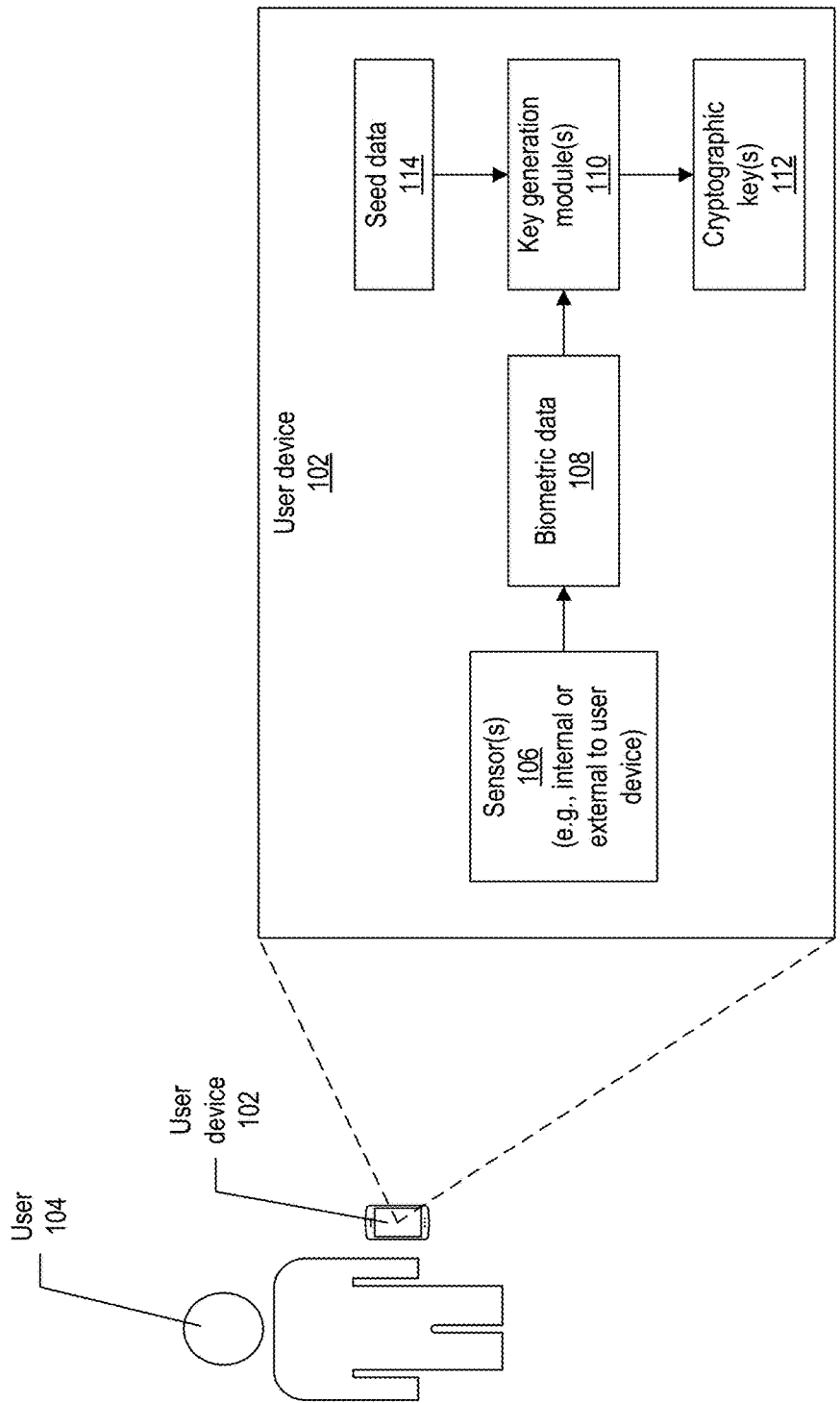
FIG. 1 depicts an example system for generating a cryptographic key based on biometric data, according to implementations of the present disclosure.

FIG. 1 depicts an example system for generating a cryptographic key based on biometric data, according to implementations of the present disclosure. As shown in the example of FIG. 1, the system may include a user device 102 that is owned by, operated by, and/or otherwise associated with a user 104. The user device 102 may include any type of computing device. In some examples, the user device 102 is a mobile and/or portable computing device such as a smartphone, tablet computer, wearable computer (e.g., watch, headset, glasses, etc.), and so forth.

The user device 102 may include one or more sensors 106, also described as sensor device(s), that are configured to collect biometric data 108 regarding the user 104. Although examples herein may describe the sensor(s) 106 as component(s) of the user device 102, implementations are not so limited. In some implementations, one or more sensors 106 may be external to the user device 102 and communicatively coupled to the user device 102. The sensor(s) 106 may include a fingerprint scanner that is configured to scan at least a portion of a finger, hand, toe, foot, or other body part of the user 104 and generate fingerprint data. As used herein, a finger may include a thumb. In some examples, a fingerprint scanner may be specifically configured to scan a finger or other body part and generate fingerprint data. In some examples, the fingerprint scanner may be a camera or other general purpose image capture device that is useable to generate fingerprint data including image(s) of at least a portion of the user's finger or other body part. The sensor(s) 106 may also include camera(s) or other image capture device(s) that are useable to generate biometric data 108 that includes still image(s) and or video of the user's face, body, retina(s), or other body part(s).

In some implementations, the sensor(s) 106 may be configured to monitor the heartbeat, pulse, respiration, brain wave activity, or other physiological characteristics of the user 104. In such examples, the biometric data 108 may include data describing the heartbeat, pulse, respiration, brain wave activity, and so forth. Such biometric data 108 may be waveform data, for example showing a periodically repeating pattern of the user's heartbeat or other physiological measurements. Implementations also support the collection and analysis of other types of biometric data 108. In some examples, the sensor(s) 106 may be external to the user device 102 and communicatively coupled to send collected biometric data 108 to the user device 102. For example, the sensor(s) 106 may include heartbeat, pulse, and/or brainwave sensors worn at the user's wrist, ankle, forehead, chest, or elsewhere. The sensor(s) 106 may collect biometric data 108 and communicate the biometric data 108 to the user device 102 via a wired or wireless connection (e.g., a BlueTooth™ or WiFi network). The sensor(s) 106 may also include audio capture device(s) such as microphone(s) to generate biometric data 108 that includes an audio recording of the user's voice. The audio data may be employed to generate a voice print of the user 104, which may be employed to determine cryptographic key(s) 112.

The biometric data 108 may be accessed by one or more key generation modules 110 executing on the user device 102 or elsewhere. The key generation module(s) 110 may analyze the biometric data 108 and generate one or more cryptographic keys 112 based on the biometric data 108 for a particular user 104. In some implementations, the key generation module(s) 110 may employ seed data 114 to generate the cryptographic key(s) 112. The generation of the cryptographic key(s) 112 based on the biometric data 108, and the use of the seed data 114 in generating the cryptographic key(s) 112, is described further below with reference to FIGS. 2-5.

Although the example of FIG. 1 shows the biometric data 108 being collected and analyzed (e.g., locally) on the user device 102 by the key generation module(s) 110, implementations are not so limited. In some implementations, the biometric data 108 may be sent from the user device 102 over one or more networks (not shown) to a remote computing device such as a server computing device. The key generation module(s) 110 may execute on the remote device to analyze the biometric data 108 and generate the cryptographic key(s) 112. The cryptographic key(s) 112 may then be communicated to the user device 102 for storage and use and/or stored on the remote device. In some implementations, the sensor(s) 106 may be external to the user device 102 and may communicate the biometric data 108 to the remote device for analysis, without the biometric data 108 passing through the user device 102.

Figure 2:
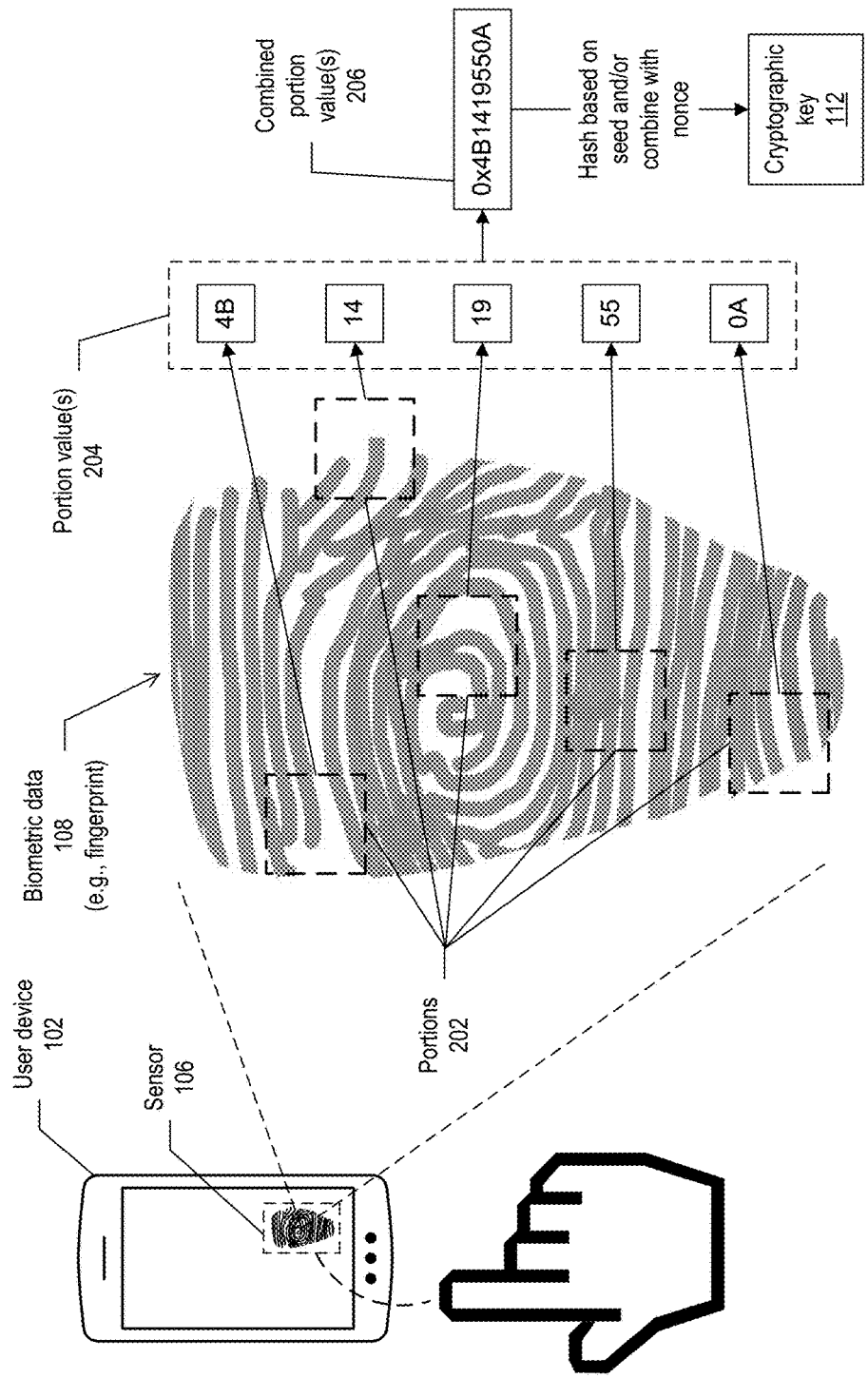
FIG. 2 depicts an example of fingerprint data analyzed to generate a cryptographic key, according to implementations of the present disclosure.

FIG. 2 depicts an example of biometric data 108 including fingerprint data analyzed to generate a cryptographic key 112, according to implementations of the present disclosure. In the example of FIG. 2, the biometric data 108 includes fingerprint data captured by a sensor 106 (e.g., a fingerprint scanner) of a user device 102. One or more portions 202 of the fingerprint data may be analyzed and, for each portion 202, a portion value 204 may be determined. In some implementations, the portion value 204 may be a numeric value that indicates a characteristic of the portion 202 being analyzed.

Figure 3A:
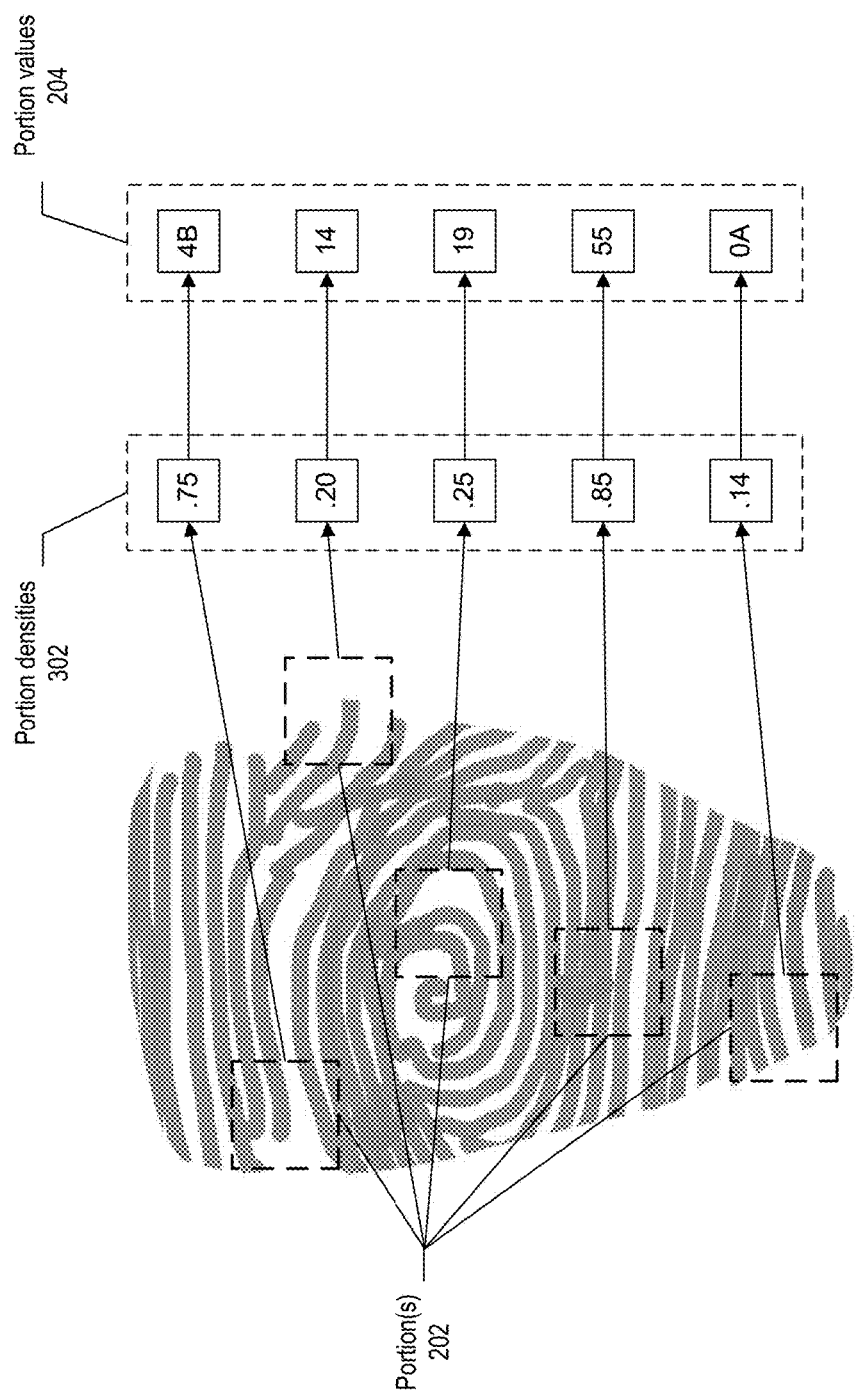
FIG. 3A depicts an example of fingerprint data analyzed to generate a cryptographic key based on portion densities, according to implementations of the present disclosure.
Figure 3B:
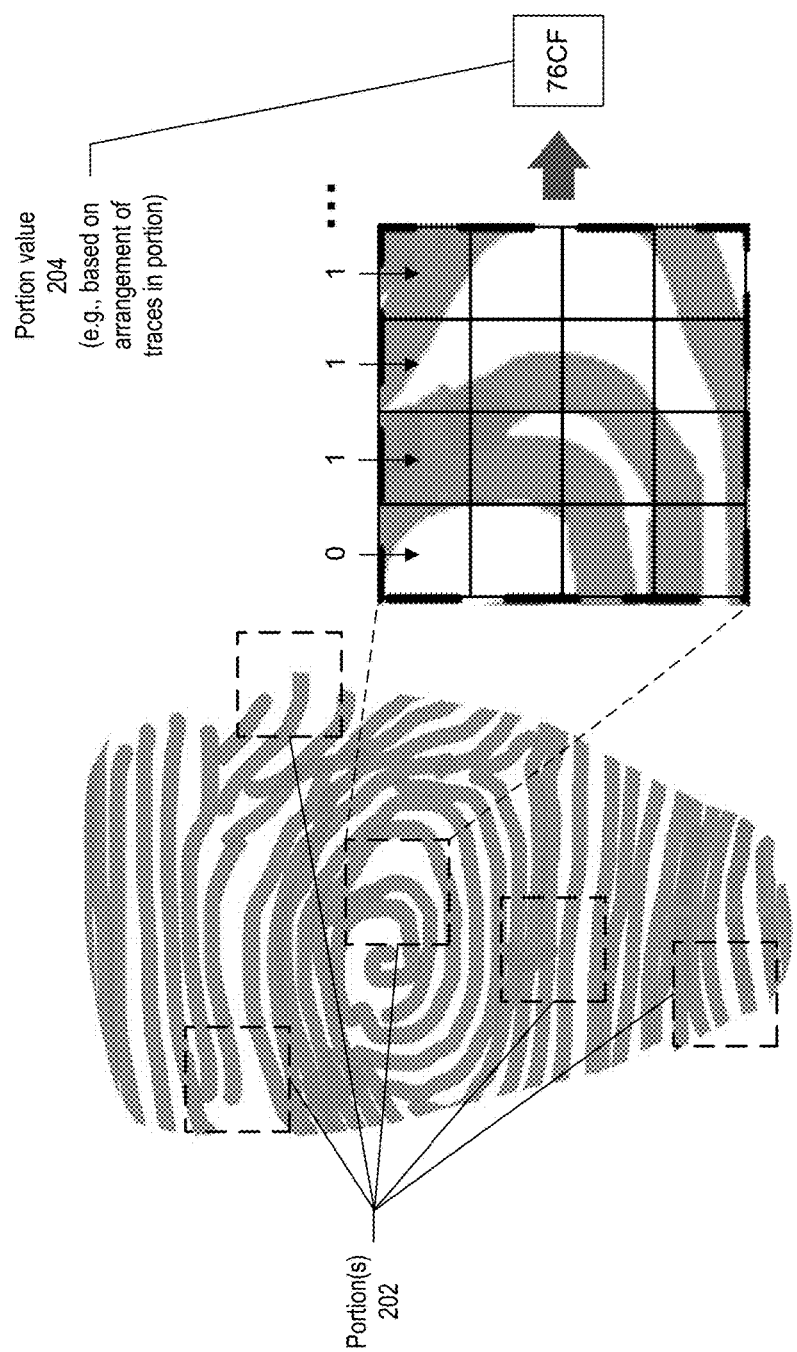
FIG. 3B depicts an example of fingerprint data analyzed to generate a cryptographic key based on arrangements of traces in portions of a fingerprint, according to implementations of the present disclosure.

FIGS. 3A and 3B depict different techniques for determining the portion values 204 for various portions 202, according to implementations. In some implementations, as shown in FIG. 3A, the portion value 204 may be based on a portion density 302 indicating the amount and/or proportion of a portion 202 that includes fingerprint data such as fingerprint traces (e.g., fingerprint grooves). For example, the portion density 302 may indicate the proportion of black pixels to white pixels in a black and white rendering of the portion 202 of the fingerprint, or a percentage of a portion 202 that includes black pixels, where black may indicate the presence of fingerprint grooves or other biometric information in the portion 202. The portion value 204 may be in a range (e.g., from 0 to 255) that indicates the amount and/or density of traces in each portion 202.

In some implementations, as shown in FIG. 3B, the portion value 204 may be based on an arrangement of the traces within a portion 202. For example, the portion 202 may be subdivided into regions and each region may be assigned a (e.g., binary) value depending on whether the region is mostly full, or mostly empty, of trace data. The binary values may then be combined (e.g., concatenated) to determine the portion value 204 of the portion 202. Alternatively, the regions may be assigned row and column numbers and the row and columns numbers of those regions that include trace data may be combined to generate the portion value 204. Although the example of FIG. 3B depicts 16 regions, arranged in 4 rows and 4 columns, implementations support the use of any number of regions. Moreover, although the examples herein may describe a particular number of portions 202 with particular sizes and locations, implementations support the use of any number of portions 202, any portion size, and any portion location to be employed for analyzing the biometric data 108.

Implementations also support the use of other techniques for generating the portion value 204 for portion(s) 202 of the fingerprint. For example, portion values 204 may be determined based on a type of pattern exhibited by the fingerprint, a proportion of horizontal vs. vertical traces in the fingerprint, a degree of concavity exhibited by the curves of the traces, and/or other characteristics of the fingerprint in one or more portions 202.

Returning to FIG. 2, the multiple portion values 204 may be combined (e.g., concatenated) to generate combined portion values 206. The combined portion values 206 may then be employed to generate the cryptographic key 112. For example, the combined portion values 206 may be hashed based on a hash seed in the seed data 114 to generate the cryptographic key 112. In some implementations, the combined portion values 206 may be combined with a nonce prior to hashing. The nonce may be a single-use number that is randomly or pseudo-randomly generated. The combined portion values 206 and nonce may be hashed to generate the cryptographic key 112. The use of a nonce may prevent an individual from using an image of the user's fingerprint (e.g., taken without authorization of the user 104) to recover the cryptographic key 112. Use of a nonce may also enable implementations to employ the same biometric data 108 to be employed to generate multiple, different cryptographic keys 112. The generation of a different cryptographic key 112 based on a different nonce may be performed if a user 104 needs a new key for any reason.

In some implementations, the numeric portion value 204 for each portion 202 may be randomly generated within a tolerance range (e.g., plus or minus five percent) of the measured numeric value of the portion 202. In some implementations, the tolerance, portion size, number of portions 202, location of portions 202, and/or hash seed may be included in the seed data 114. In some implementations, the portions 202 may have a consistent, pre-determined size and the locations of the portions 202 to analyze within the fingerprint may be randomized. The tolerance setting may be used to round the measurement of fill of the portion 202 and can be calibrated to the hardware resources of the computing device where the biometric data 108 is being analyzed. For example, the tolerance may be calibrated based on the processing and/or memory resources of the device to ensure that the cryptographic key 112 may be generated in real time with respect to the collection of the biometric data 108, e.g., within a predetermined and/or short period of time following the data collection. The use of a tolerance range in generating the portion values 204 may be described as fuzzy analysis or fuzzy logic. In some implementations, the fingerprint image may be rotated to a consistent angle prior to analyzing the fingerprint data to generate the key 112.

The tolerance, portion size, and/or number of portions 202 may be varied to achieve the desired level of security for the cryptographic key 112. For example, the larger the portion size, the more accurate the matches may be when comparing a previously generated key 112 to a current fingerprint. The tolerance, portion size, and/or number of portion may be set by a device manufacturer, set by a user 104, and/or automatically set based on processing power available on the device where the analysis is performed. For example, a device with low processing capability may collect and/or analyze data for two portions 202, whereas a device with higher processing capability may collect and/or analyze data for more portions 202. Tolerance and portion size may enable the handling of errors and/or misreads, and may provide for the faster reading of fingerprints. In some implementations, the biometric data 108 may include data for those portions 202 of the fingerprint to be analyzed, and may omit other parts of the fingerprint.

The tolerance, number of portions, and/or portion size may be calibrated to achieve a balance between security and user experience. A high tolerance and/or larger portion size may be used to ensure that the same key 112 is generated based on the same user's fingerprint. More portions, finer granularity (e.g., smaller portion size), and/or lower tolerance may provide for a more secure key 112, but may also lead to a higher probability that the same fingerprint generates different keys 112.

In some implementations, a seed number may be employed in generating the key 112 based on fingerprint data or other biometric data 108. The seed number may be used in hashing the combined portion values 206 to generate the key 112. The seed number may be included in the seed data 114. The seed data 114 may also indicate other parameters for key generation, such as the number of portions 202, the portion size, the portion locations, the order of portions when concatenating the portion values 204 to generate the combined portion values 206, and/or the tolerance to be used for generating the portion values 204. If a key 112 is compromised (e.g., if an unauthorized entity may have gained access to the key 112), the seed data 114 may be reset to force the generation of a new key 112 based on one or more of different portions, different portion size, different portion order, a different nonce (e.g., random number), and so forth. In some examples, the same set of portions 202 may be employed to generate a different key based on different seed data 114.

Figure 4:
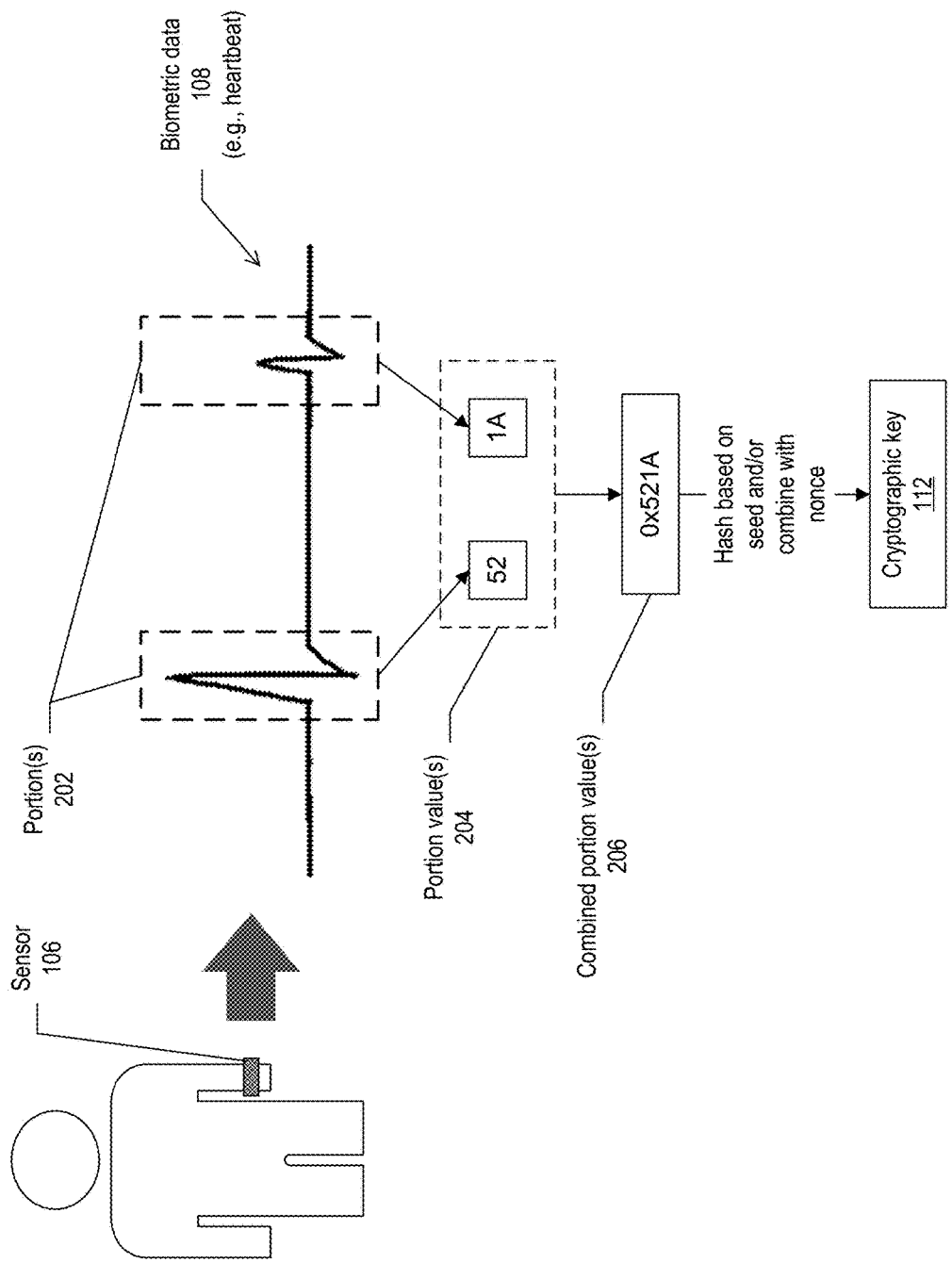
FIG. 4 depicts an example of heartbeat data analyzed to generate a cryptographic key, according to implementations of the present disclosure.

FIG. 4 depicts an example of biometric data 108 including heartbeat data analyzed to generate a cryptographic key 112, according to implementations of the present disclosure. Heartbeat data may be used instead of or in addition to fingerprint data to generate a key 112. As shown in the example of FIG. 4, different portions of a measured heartbeat waveform may be analyzed to determine portion values 204 that indicate particular characteristic(s) of the analyzed portions 202. The portion values 204 may be combined to generate the combined portion values 206, and the combined portion values 206 may be hashed, combined with a nonce, and/or otherwise processed to generate a key 112 as described above. In some instances, the portion values 204 may be combined with other keys and/or other portion values based on other biometric data. The portion values 204 may be based on pulse width, pulse height, spacing between pulses, and/or other characteristics of the waveform. Any portion of the heartbeat pattern may be used to generate portion values 204. In some examples, the heartbeat may be measured while the user 104 is in a resting state, to ensure that the same key 112 is generated at different times based on the user's heartbeat. In some implementations, heartbeat may be measured over a period of time (e.g., throughout the day) by a wearable device (e.g., a watch computing device), and averaged over time to determine the typical heartbeat waveform for the user 104. That typical heartbeat waveform may be analyzed to generate the key 112.

In some examples, keys 112 based on heartbeat analysis may be subject to a high likelihood of collision, given similarities between individual heartbeat patterns. Accordingly, in some implementations a key 112 is generated based on a combination of fingerprint data and heartbeat data. For example, a user 104 may wear a watch computing device 102, other wearable device, and/or wearable sensor(s) 106 throughout the day. The sensor(s) 106 included in or external to the user device 102 may periodically measure the user's heartbeat and the heartbeat data may be stored on the user device 102 or elsewhere. The various measured samples of heartbeat data may be averaged or otherwise correlated to determine a typical heartbeat waveform for the user 104. The typical waveform may be stored to be available for use in key generation. When the user 104 is preparing to sign a document, request access to data, authenticate, or perform some other activity, the user 104 may place their finger on the sensor 106 of the smartphone or other user device 102 to enable the sensor 106 to capture the fingerprint data. The smartphone may be paired with the watch and configured to retrieve the stored heartbeat data from the watch. The key generation module(s) 110 executing on the smartphone or another device may use the fingerprint data and retrieved heartbeat data to generate the key 112.

In some implementations, the key 112 may be generated each time the user 104 attempts an activity that employs the key 112, such as authentication, signing a document, accessing secure data and/or systems, and/or other activities. The activity may be allowed if the re-generated key 112 corresponds to a previously generated key 112 associated with the user 104. Alternately, instead of re-generating the key 112 from the biometric data 108, the key 112 may be stored on the user device 102 to be available for signing documents or performing other activities. In some implementations, the key 112 may be useable under particular circumstances, such as when a watch computing device is being worn by the user 104, is activated or unlocked, and/or is paired with the user's smartphone. In such implementations, the presence and unlocked state of the worn watch device may be used to authorize the use of the previously generated and stored key 112 for signing documents or performing other activities.

Although examples herein may describe the use of fingerprint data and heartbeat data for generating keys 112, implementations are not limited to any particular type(s) of biometric data. Other biometric data 108 may also be used for key generation, such as retina scan data, facial image data, voiceprint data, brainwave activity data, and so forth. Facial image data may be employed to generate a key 112 by analyzing portions of the face at particular points of interest such as the eyes, nose, mouth, and so forth. Portion values may be determined based on characteristics of the portions and/or the relationship (e.g., distance and/or orientation) between such points of interest, and the key 112 may be generated based on the combined portion values. Retina scan data may be employed by analyzing various portions of the retina of a user 104 similarly to the analysis of the fingerprint data. Voiceprint data may be employed by analyzing portions of the waveform of the collected audio data of the user's voice, and may be similar to the waveform analysis of the heartbeat data.

Figure 5A:
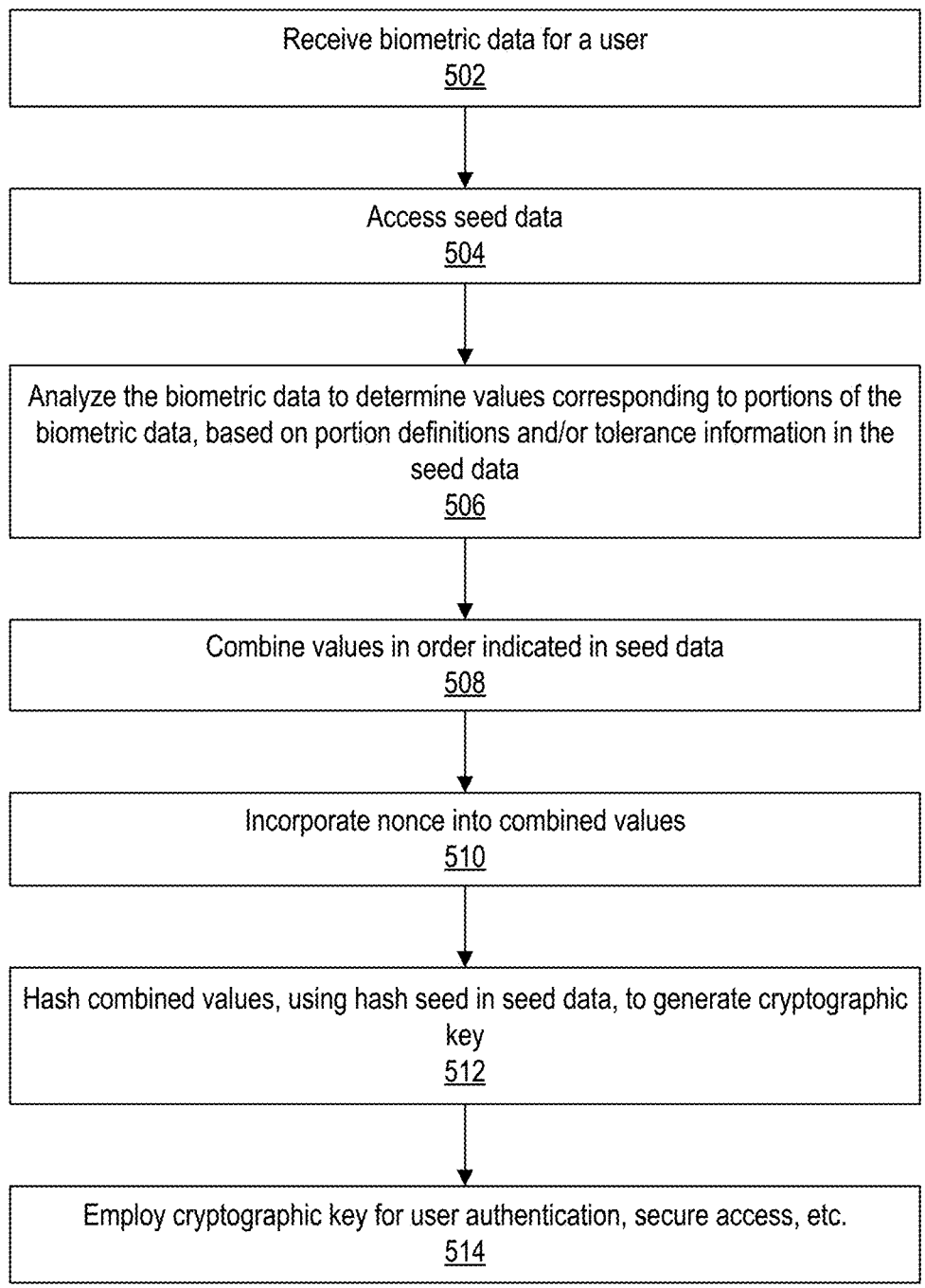
FIG. 5A depicts a flow diagram of an example process for generating a cryptographic key based on biometric data, according to implementations of the present disclosure.

FIG. 5A depicts a flow diagram of an example process for generating a cryptographic key 112 based on biometric data 108, according to implementations of the present disclosure. Operations of the process may be performed by the sensor(s) 106, the key generation module(s) 110, and/or other software and/or hardware components of the user device 102 or other computing device(s).

The biometric data 108 may be received (502) or otherwise accessed. In some implementations, the seed data 114 may also be accessed (504). As described above, the biometric data 108 may be analyzed (506) to determine the portion values 204 corresponding to portions 202 of the biometric data 108. In some implementations, the analysis may be based at least partly on the seed data 114. For example, the seed data 114 may specify a number of portions 202, a size of the portions 202, locations of the portions 202, a tolerance for portion value generation, and/or other information useable for generating portion values 204.

The portion values 204 may be combined (508) to generate the combined portion values 206. Combination may include concatenation of the portion values 204, or some other operation. The seed data 114 may specify an order in which the portion values 204 are to be combined to generate the combined portion values 206.

In some implementations, a nonce is incorporated (510) into the combined portion values 206 prior to hashing. The combined portion values 206 are hashed (512) to generate the cryptographic key 112. In some implementations, the seed data 114 includes a seed to be used in hashing the combined portion values 206 to generate the cryptographic key 112.

The cryptographic key 112 may be employed (514) to perform one or more operations associated with the user 104. The cryptographic key 112 may be employed for various purposes, including but not limited to: authenticating the user 104, enabling the user's access to secure data, enabling access to a system, enabling access to a secure section of an application, signing a digital document, and so forth. In some implementations, the cryptographic key 112 (e.g., a private key) may not be stored on the user device 102 or elsewhere. Instead, the cryptograph key 112 may be generated for each instance when it is used for authentication or access. Generation of the key for each use may prevent the key from being compromised. Alternatively, the cryptographic key 112 may be stored on the user device 102 or elsewhere.

Figure 5B:
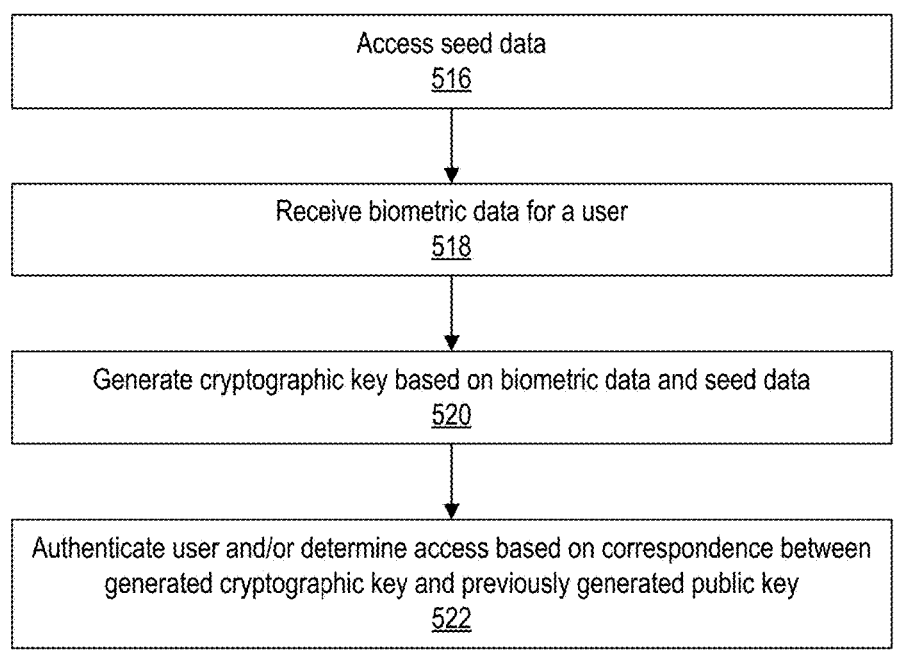
FIG. 5B depicts a flow diagram of an example process for using a cryptographic key that is generated based on biometric data, according to implementations of the present disclosure.

FIG. 5B depicts a flow diagram of an example process for using a cryptographic key that is generated based on biometric data, according to implementations of the present disclosure. Operations of the process may be performed by the sensor(s) 106, the key generation module(s) 110, and/or other software and/or hardware components of the user device 102 or other computing device(s).

In some implementations, at least a portion of the seed data 114 (e.g., the hash seed) may be stored on the user device 102 or elsewhere after the seed data 114 is initially used to generate a private key and public key. In such implementations, the stored seed data 114 may be accessed (516). Current biometric data 108 for the user 104 may be received (518), and a cryptographic key 112 (e.g., private key) may be generated (520) based on the biometric data 108 and the seed data 114 as described above. The private key 112 may be compared to a previously generated public key to determine whether the private key 112 corresponds to the public key. A determination may be made (522) whether to authenticate a user 104 and/or enable access to secure information based on the correspondence or lack thereof.

Figure 6A:
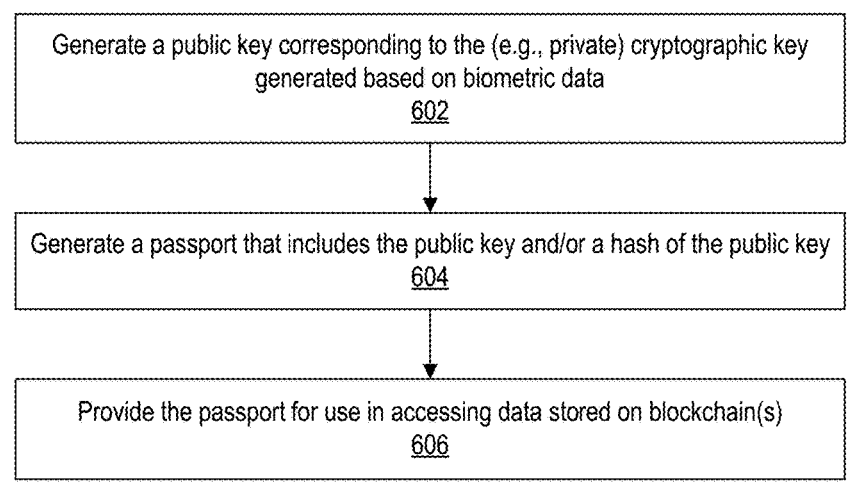
FIG. 6A depicts a flow diagram of an example process for generating a passport for blockchain access based on a generated cryptographic key, according to implementations of the present disclosure.

FIG. 6A depicts a flow diagram of an example process for generating a passport for blockchain access based on a generated cryptographic key 112, according to implementations of the present disclosure. Operations of the process may be performed by the sensor(s) 106, the key generation module(s) 110, and/or other software and/or hardware components of the user device 102 or other computing device(s).

The generated cryptographic key 112 may be accessed and employed to generate a public key (602) that corresponds to the (e.g., private) key 112. A passport may be generated (604) that includes the public key and/or a hash of the public key. The passport may also be described as a digital certification, and may be associated with the particular user 104 whose biometric data 108 was used to generate the associated key 112. The passport may be provided (606) to the user 104 for use in accessing secure data, accessing systems, signing documents, authenticating the user 104, or for other purposes. In some examples, the passport may be employed to access secure data stored on one or more blockchains. In some implementations, they public key may be (e.g., directly) associated with a blockchain address. Biometric data may be employed as described above to generate a blockchain address in addition to, or instead of, generating a cryptographic key 112. In this way, implementations enable the generation of a blockchain address even without accessing a network.

Figure 6B:
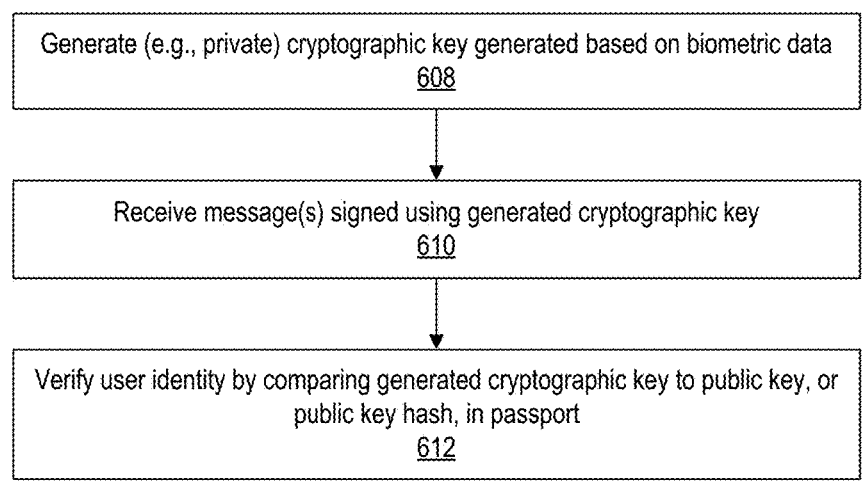
FIG. 6B depicts a flow diagram of an example process for verifying user identity, according to implementations of the present disclosure.

FIG. 6B depicts a flow diagram of an example process for verifying user identity, according to implementations of the present disclosure. Operations of the process may be performed by the sensor(s) 106, the key generation module(s) 110, and/or other software and/or hardware components of the user device 102 or other computing device(s).

A cryptographic key 112, such as a private key, may be generated (608) based on biometric data 108 as described above. The user 104 may employ the key 112 to sign one or more messages (610). The message(s) may be received, and the identity of the user 104 may be verified (612) by comparing the key 112 used for signing the message(s) to a public key (or a hash of a public key) included in a previously generated passport. If the private key corresponds to the public key, the user's identity may be verified.

In some examples, the passport may be provided for verifying identity in blockchain transactions. A passport may store data that digitally associates an individual (e.g., a user 104) with a single digital token, such as the cryptographic key 112. In some instances, a passport may be issued by a trusted authority. The trusted authority may be any entity that is recognized as trustworthy by various parties involved in blockchain transactions. An authority may issue a passport after verifying that an individual is who they claim to be, and the authority may associate the individual's identity with a blockchain address. Subsequently, the individual may employ the passport to establish their identity in a blockchain transaction, such as to sign a message or a document stored in a blockchain. A recipient entity may examine the passport to determine whether it was issued by a trusted authority. If so, the recipient entity may trust the individual's purported identity, and approve the transaction or take other appropriate actions. If the passport is not issued by a trusted authority, the recipient entity may reject the transaction or ask for additional information to verify the individual's identity.

Passport creation may include steps performed on the user device 102 and/or on a device associated with the authority. A user may have a private key used during passport creation. In some examples, a software component may operate to generate the private key and provide it to the user. Alternatively, biometric data 108 may be used to generate the private key 112 as described above. The user may provide the private key to the trusted authority. The trusted authority may use the private key to generate a corresponding public key which is incorporated into a generated passport. The passport may be provided to the user. In some examples, the user may provide the public key as sufficient proof of identity for passport generation. In some examples, the blockchain address is sufficient proof. In some examples, use of biometric data 108 may ensure that an individual is only allowed to have one passport registered and that the passport is only accessible by the associated individual. To secure passports and ensure that a passport is tied to a particular individual, the same passport may be regenerated using biometric data that is unique to an individual, such as fingerprint data. The biometric data may be represented by a key as described above. Moreover, access to the passport may be restricted and control through authentication method (s) that employ biometric data. The public key in the passport may be visible when the user is signing documents, but the private key may remain hidden. In some instances, the private key may be stored securely on the user device or elsewhere, and/or may not be visible to the user. As described above, the private key may be created as needed based on biometric data.

The passport may be used by an individual to establish their identity when updating data stored in a blockchain, such as signing a document stored in a blockchain. For example, the passport may be employed when signing deeds, titles, contracts, and/or other documents stored in a blockchain. The passport may also be employed as a real-world passport, e.g., in scenarios when cross-border transits are handled electronically. Use of a passport enables verification of personal identities used on blockchains automatically without manual interrogation. Traditionally, notaries are employed to verify that an individual has the proper identification at the time of signing a document. Such verification of a physical document is susceptible to falsification and fraud. Through use of a digital passport, implementations enable a shift away from traditional notaries, providing a more secure technique for identity verification.

The passport may be an abstract data representation that includes a public and private key pair, where the private key may be generated based on biometric data as described above. The passport may also include other data such as a person's name, address, image(s), and/or identifier(s) such as social security number (SSN), driver's license number, government-issued passport number, and so forth. In some examples, the passport may include a creation date. The passport may also identify the trusted authority that issued the passport. A passport may be used as an individual's custom seal which, when enforced correctly, would be difficult or impossible to steal, forge, or tamper with. The key generated from the biometric data may be used to generate a passport and may be associated with an address. In some examples, other entities may not know the identity of the user associated with the passport until the user begins signing documents using the passport.

In some examples, a passport could be linked with a person's reputation, and may be used instead of credit records, driver's license, social security number, or national passports, given that the passport may be a more secure token than a spoof-able piece of paper. In some scenarios, an individual may be required to provide a social security number or a driver's license number to prove their identity. Accordingly, identity theft is a problem because such documents are easy to forge and are widely used. For situations that require more security, other documents may be required such as a birth certificate, driver's license, picture in a yearbook, utility bills, and so forth. These forms of identification are also spoof-able and security systems may be rendered even more vulnerable as more trust is put in a larger number of vulnerable security documents. In comparison, implementations may provide a digital passport that is harder to steal, forge, or tamper with compared to traditional paper documents.

In blockchain environments today, anyone can claim ownership of an address by signing a message that includes the address. For example, a person can register an address with a blockchain-based digital currency network (e.g., BitCoin™) and use that address for sending or receiving money. The address can also be used to sign messages. Thus, the "identity verification" currently performed in blockchain environments may only prove that an individual has access to an address, and may not actually verify the identity of the individual using the address. The implementations described herein may provide a blockchain environment with a trusted technique for associating an identity with an address. In some examples, a user's identity may be verified by providing one or more messages that are signed using the user's biometric-generated key, thus proving that the user owns the key and is associated with the identity. Such message(s) may be unique and/or unrepeatable.

To provide further context for the present disclosure, a high-level discussion of blockchain technology is provided. In general, a blockchain is a public ledger of all transactions that have ever been executed in one or more contexts (e.g., negotiable instrument transactions, digital currency transactions, etc.). A blockchain constantly grows as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions (e.g., deposits of checks). Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all users (e.g., financial institutions) need to know all previous transactions (e.g., deposits, withdrawals, etc.) to validate a requested transaction, all users must agree on which transactions have actually occurred, and in which order. For example, if two users observe different transaction histories, they will be unable to come to the same conclusion regarding the validity of a transaction. The blockchain enables all users to come to an agreement as to transactions that have already occurred, and in which order. In short, and as described in further detail below, a ledger of transactions is agreed to based on the amount of work required to add a transaction to the ledger of transactions (e.g., add a block to the blockchain). In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF.

For example, the input to the CHF can include a reference to the previous (most recent) block in the blockchain, details of the transaction(s) that are to be included in the to be created block, and a nonce value (e.g., a random number used only once).

As introduced above, multiple nodes compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger system can include one or more sidechains. A sidechain can be described as a blockchain that validates data from other blockchains. In some examples, a sidechain enables ledger assets (e.g., a digital currency) to be transferred between multiple blockchains.

In some implementations, one or more of the public key, the seed data, the hash seed, or the hash token may be stored. In some implementations, the private key may not be stored in persistent storage on the user device 102 or elsewhere. The private key may be generated, based on the biometric data, each time it is used. In this way, implementations may provide a cryptographic key that is less vulnerable to being accessed by unauthorized entities or otherwise compromised.

Figure 7:
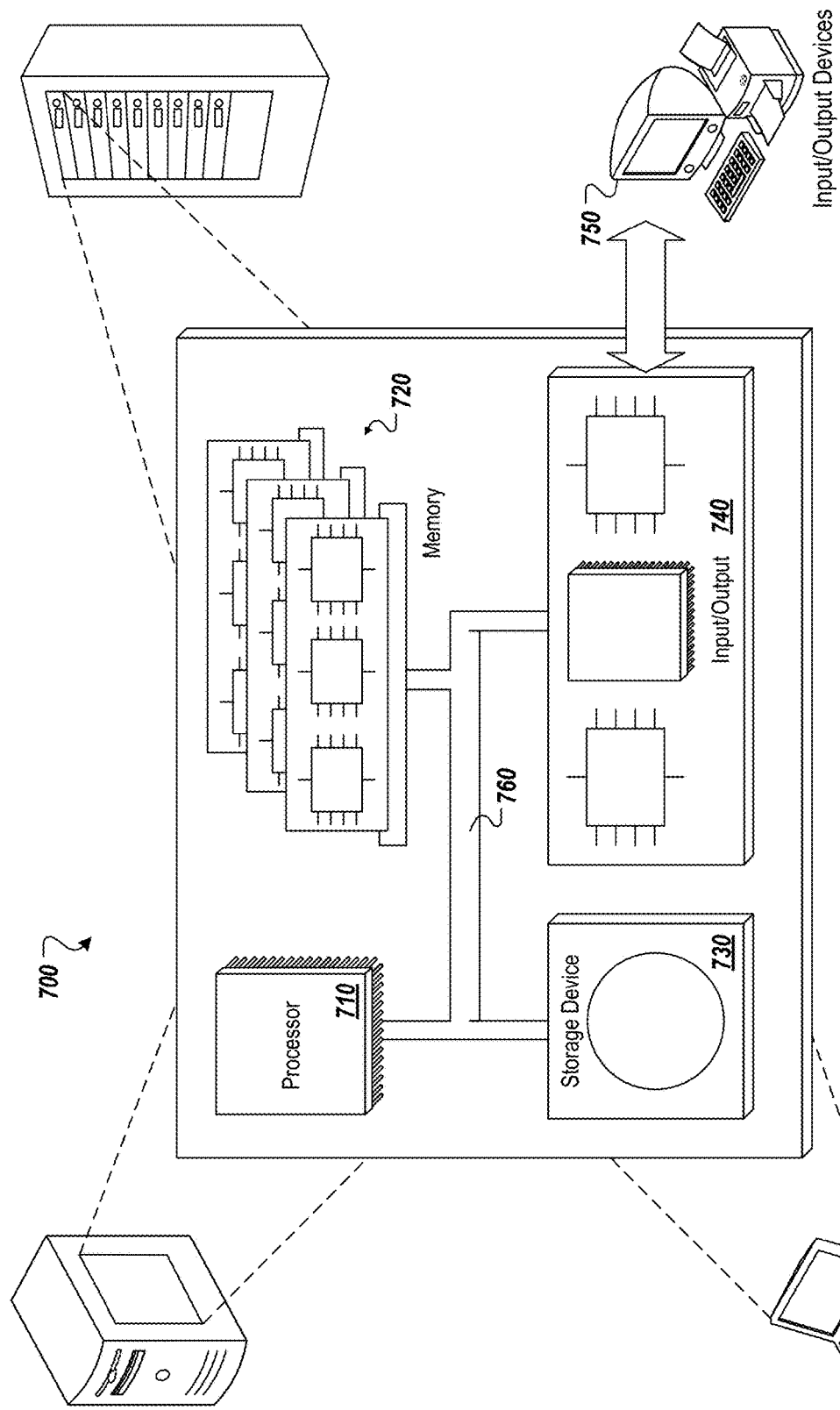
FIG. 7 depicts an example computing system, according to implementations of the present disclosure.

FIG. 7 depicts an example computing system, according to implementations of the present disclosure. The system 700 may be used for any of the operations described with respect to the various implementations discussed herein. For example, the system 700 may be included, at least in part, in the user device 102 described herein. The system 700 may include one or more processors 710, a memory 720, one or more storage devices 730, and one or more input/output (I/O) devices 750 controllable through one or more I/O interfaces 740. The various components 710, 720, 730, 740, or 750 may be interconnected through at least one system bus 760, which may enable the transfer of data between the various modules and components of the system 700.

The processor(s) 710 may be configured to process instructions for execution within the system 700. The processor(s) 710 may include single-threaded processor(s), multi-threaded processor(s), or both. The processor(s) 710 may be configured to process instructions stored in the memory 720 or on the storage device(s) 730. The processor(s) 710 may include hardware-based processor(s) each including one or more cores. The processor(s) 710 may include general purpose processor(s), special purpose processor(s), or both.

The memory 720 may store information within the system 700. In some implementations, the memory 720 includes one or more computer-readable media. The memory 720 may include any number of volatile memory units, any number of non-volatile memory units, or both volatile and non-volatile memory units. The memory 720 may include read-only memory, random access memory, or both. In some examples, the memory 720 may be employed as active or physical memory by one or more executing software modules.

The storage device(s) 730 may be configured to provide (e.g., persistent) mass storage for the system 700. In some implementations, the storage device(s) 730 may include one or more computer-readable media. For example, the storage device(s) 730 may include a floppy disk device, a hard disk device, an optical disk device, or a tape device. The storage device(s) 730 may include read-only memory, random access memory, or both. The storage device(s) 730 may include one or more of an internal hard drive, an external hard drive, or a removable drive.

One or both of the memory 720 or the storage device(s) 730 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 700. In some implementations, the CRSM may include a data store that provides storage of computer-readable instructions or other information in a non-transitory format. The CRSM may be incorporated into the system 700 or may be external with respect to the system 700. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 710 and the memory 720 may be supplemented by, or incorporated into, one or more application-specific integrated circuits (ASICs).

The system 700 may include one or more I/O devices 750. The I/O device(s) 750 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 750 may also include one or more output devices such as a display, LED(s), an audio output device (e.g., a speaker), a printer, a haptic output device, and so forth. The I/O device(s) 750 may be physically incorporated in one or more computing devices of the system 700, or may be external with respect to one or more computing devices of the system 700.

The system 700 may include one or more I/O interfaces 740 to enable components or modules of the system 700 to control, interface with, or otherwise communicate with the I/O device(s) 750. The I/O interface(s) 740 may enable information to be transferred in or out of the system 700, or between components of the system 700, through serial communication, parallel communication, or other types of communication. For example, the I/O interface(s) 740 may comply with a version of the RS-232 standard for serial ports, or with a version of the IEEE 1284 standard for parallel ports. As another example, the I/O interface(s) 740 may be configured to provide a connection over Universal Serial Bus (USB) or Ethernet. In some examples, the I/O interface(s) 740 may be configured to provide a serial connection that is compliant with a version of the IEEE 1394 standard.

The I/O interface(s) 740 may also include one or more network interfaces that enable communications between computing devices in the system 700, or between the system 700 and other network-connected computing systems. The network interface(s) may include one or more network interface controllers (NICs) or other types of transceiver devices configured to send and receive communications over one or more networks using any network protocol.

Computing devices of the system 700 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 700 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS)

receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor device, the method comprising:
   receiving, by the at least one processor device, biometric data collected by at least one sensor device in proximity to a user, the biometric data describing at least one physiological characteristic of the user;
   determining, by the at least one processor device, a plurality of values based on the biometric data, each value of the plurality of values determined based on a respective portion of the biometric data, wherein determining each value of the plurality of values based on the biometric data comprises determining an initial value based on an analysis of the respective portion of the biometric data, and randomly varying the initial valve within a calibrated tolerance range to generate each value of the plurality of values;
   providing, by the at least one processor device, a cryptographic key based at least partly on a combination of the determined plurality of values to ensure the cryptographic key is generated in real time with respect to the collection of the biometric data;
   generating, by the at least one processor device, a passport that includes a public key corresponding to the provided cryptographic key; and
   providing, by the at least one processor device, the passport for use in accessing data stored on at least one blockchain based upon the provided cryptographic key.

2. The method of claim 1, wherein:
   the biometric data includes at least one fingerprint; and
   the plurality of values are determined based on different portions of the fingerprint.

3. The method of claim 2, wherein each value indicates a density of traces in a corresponding portion of the fingerprint.

4. The method of claim 2, wherein each value indicates an arrangement of traces in a corresponding portion of the fingerprint.

5. The method of claim 1, wherein:
   the biometric data includes at least one heartbeat waveform; and
   the plurality of values are determined based on different portions of the heartbeat waveform.

6. The method of claim 1, wherein generating the cryptographic key includes:
   accessing seed data including a seed; and
   hashing the combination of the plurality of values, based on the seed, to generate the cryptographic key.

7. The method of claim 6, wherein the seed data comprises the tolerance range, a size of the respective portion of the biometric data, a location of the respective portion of the biometric data, and a number of portions of the biometric data.

8. The method of claim 1, further comprising:
   providing, by the at least one processor device, the cryptographic key for use in signing a digital document.

9. The method of claim 1, comprising employing, by the at least one processor device, the cryptographic key to perform at least one action associated with the user.

10. A system, comprising:
- at least one processor device; and
- a memory communicatively coupled to the at least one processor device, the memory storing instructions which, when executed by the at least one processor device, cause the at least one processor device to perform operations comprising:
- receiving biometric data collected by at least one sensor device in proximity to a user, the biometric data describing at least one physiological characteristic of the user;
- determining a plurality of values based on the biometric data, each value of the plurality of values determined based on a respective portion of the biometric data, wherein determining each value of the plurality of values based on the biometric data comprises determining an initial value based on an analysis of the respective portion of the biometric data, and randomly varying the initial valve within a calibrated tolerance range to generate each value of the plurality of values;
- providing a cryptographic key based at least partly on a combination of the determined plurality of values to ensure the cryptographic key is generated in real time with respect to the collection of the biometric data;
- generating a passport that includes a public key corresponding to the provided cryptographic key; and
- providing the passport for use in accessing data stored on at least one blockchain based upon the provided cryptographic key.

11. The system of claim 10, wherein:
- the biometric data includes at least one fingerprint; and
- the plurality of values are determined based on different portions of the fingerprint.

12. The system of claim 11, wherein each value indicates a density of traces in a corresponding portion of the fingerprint.

13. The system of claim 11, wherein each value indicates an arrangement of traces in a corresponding portion of the fingerprint.

14. The system of claim 10, wherein:
- the biometric data includes at least one heartbeat waveform; and
- the plurality of values are determined based on different portions of the heartbeat waveform.

15. The system of claim 10, wherein generating the cryptographic key includes:
- accessing seed data including a seed; and
- hashing the combination of the plurality of values, based on the seed, to generate the cryptographic key.

16. One or more non-transitory computer-readable storage media storing instructions which, when executed by at least one processor device, cause the at least one processor device to perform operations comprising:
- receiving biometric data collected by at least one sensor device in proximity to a user, the biometric data describing at least one physiological characteristic of the user;
- determining a plurality of values based on the biometric data, each value of the plurality of values determined based on a respective portion of the biometric data wherein determining each value of the plurality of values based on the biometric data comprises determining an initial value based on an analysis of the respective portion of the biometric data, and randomly varying the initial valve within a calibrated tolerance range to generate each value of the plurality of values;
- providing a cryptographic key based at least partly on a combination of the determined plurality of values to ensure the cryptographic key is generated in real time with respect to the collection of the biometric data;
- generating a passport that includes a public key corresponding to the provided cryptographic key; and
- providing the passport for use in accessing data stored on at least one blockchain based upon the provided cryptographic key.

17. The one or more non-transitory computer-readable storage media of claim 16, wherein:
- the biometric data includes at least one fingerprint; and
- the plurality of values are determined based on different portions of the fingerprint.

18. The one or more non-transitory computer-readable storage media of claim 17, wherein each value indicates a density of traces in a corresponding portion of the fingerprint.

19. The one or more non-transitory computer-readable storage media of claim 17, wherein each value indicates an arrangement of traces in a corresponding portion of the fingerprint.

20. The one or more non-transitory computer-readable storage media of claim 16, further comprising employing the cryptographic key to perform at least one action associated with the user.

* * * * *

UNITED STATES PATENT AND TRADEMARK OFFICE
CERTIFICATE OF CORRECTION

PATENT NO. : 10,454,677 B1
APPLICATION NO. : 15/441494
DATED : October 22, 2019
INVENTOR(S) : Alexander B. Nagelberg et al.

It is certified that error appears in the above-identified patent and that said Letters Patent is hereby corrected as shown below:

On the Title Page

1. In item (73), under "Assignee", in Column 1, Lines 1 & 2, delete "United Services Automobile Associate (USAA)" and insert -- United Services Automobile Association (USAA) --, therefor.

In the Specification

2. In Column 4, Line 33, delete "and or" and insert -- and/or --, therefor.

In the Claims

3. In Column 20, Line 15, in Claim 16, delete "data" and insert -- data, --, therefor.

Signed and Sealed this
Twenty-fifth Day of February, 2020

Andrei Iancu
*Director of the United States Patent and Trademark Office*